US009489382B2

(12) United States Patent
Roy et al.

(10) Patent No.: US 9,489,382 B2
(45) Date of Patent: Nov. 8, 2016

(54) DIGITAL PUBLISHING PLATFORM

(71) Applicant: TATA Consultancy Services Limited, Mumbai (IN)

(72) Inventors: Subrata Roy, Monmouth Junction, NJ (US); Seetharaman Krishnamoorthy, HSR Layout (IN); Tomal Deb, Kolkata (IN); Manish Mandal, Kolkata (IN)

(73) Assignee: TATA Consultancy Services Limited, Mumbai (IN)

( * ) Notice: Subject to any disclaimer, the term of this patent is extended or adjusted under 35 U.S.C. 154(b) by 359 days.

(21) Appl. No.: 14/050,758

(22) Filed: Oct. 10, 2013

(65) Prior Publication Data

US 2014/0101182 A1     Apr. 10, 2014

Related U.S. Application Data

(60) Provisional application No. 61/711,786, filed on Oct. 10, 2012.

(51) Int. Cl.
*G06F 7/00* (2006.01)
*G06F 17/30* (2006.01)

(52) U.S. Cl.
CPC .............................. *G06F 17/30011* (2013.01)

(58) Field of Classification Search
CPC ................. G06F 17/30569; G06F 17/30067; G06F 17/30286; G06F 17/30595; G06F 17/30961
USPC ........................................................ 707/756
See application file for complete search history.

(56) References Cited

U.S. PATENT DOCUMENTS

| 7,853,608 B2* | 12/2010 | Sareday ................... G06F 8/10 707/769 |
| 8,065,303 B2* | 11/2011 | Probst ............... G06F 17/30038 707/736 |
| 2007/0168374 A1* | 7/2007 | Bourne ............ G06F 17/30038 |
| 2007/0269044 A1* | 11/2007 | Bruestle ................. G06F 21/10 380/54 |
| 2013/0124972 A1* | 5/2013 | Le Chevalier .......... G06F 21/10 715/234 |
| 2013/0139053 A1* | 5/2013 | Le Chevalier ..... G06Q 30/0601 715/255 |

* cited by examiner

*Primary Examiner* — Robert Beausoliel, Jr.
*Assistant Examiner* — Michael Pham
(74) *Attorney, Agent, or Firm* — Schwegman Lundberg & Woessner, P.A.

(57) ABSTRACT

The present subject matter relates in general to system and method of content management and content life cycle management on a digital publishing platform. More specifically, the present subject matter relates to methods and systems for publishing, collaborating, distributing, managing, and subscribing digital contents and rights using a content-centric approach. Some such embodiments include receiving an electronic data item including at least one content item and based on a type of the electronic data item, identifying in a configuration-setting repository, a normalized data type for which the electronic data item is to be stored in. The electronic data item may then be transformed to the identified normalized form. Such embodiments may further extract content items from the electronic data item and performing a semantic analysis on each extracted content item to generate metadata descriptive of each respective content item. The extracted content items and metadata may then be stored.

18 Claims, 5 Drawing Sheets

DIGITAL PUBLISHING PLATFORM

RELATED APPLICATION

This application is related and claims the benefit of priority to U.S. Provisional Patent Application Ser. No. 61/711,786, filed on Oct. 10, 2012, entitled DIGITAL PUBLISHING PLATFORM, the entirety of which is incorporated herein by reference.

BACKGROUND INFORMATION

The present subject matter relates in general to systems and methods of content management and content life cycle management on a digital publishing platform. More specifically, the present subject matter relates to methods and systems for publishing, collaborating, distributing, managing, and subscribing digital contents and rights using a content-centric approach.

In most of the modern enterprises, information exists in digital form, be it the information being produced or consumed, and thus information service providers are seeking innovative ways to cope up with the dynamic changes in the industry, particularly in the digital publishing platform space, with the aim to deliver the right content to the addressable market with speed and agility.

One challenge in the existing systems is a limited capability to reuse and repurpose information and lack of a content-centric approach to provide a unified content view. This lack of unified content view emanates from disparate and non-integrated content storage systems resulting in duplicated efforts and closed information silos. This contributes to high costs in terms of time and money resulting from duplicated efforts, systems, system and content maintenance, and excessive scale.

DETAILED DESCRIPTION

Figure 1:
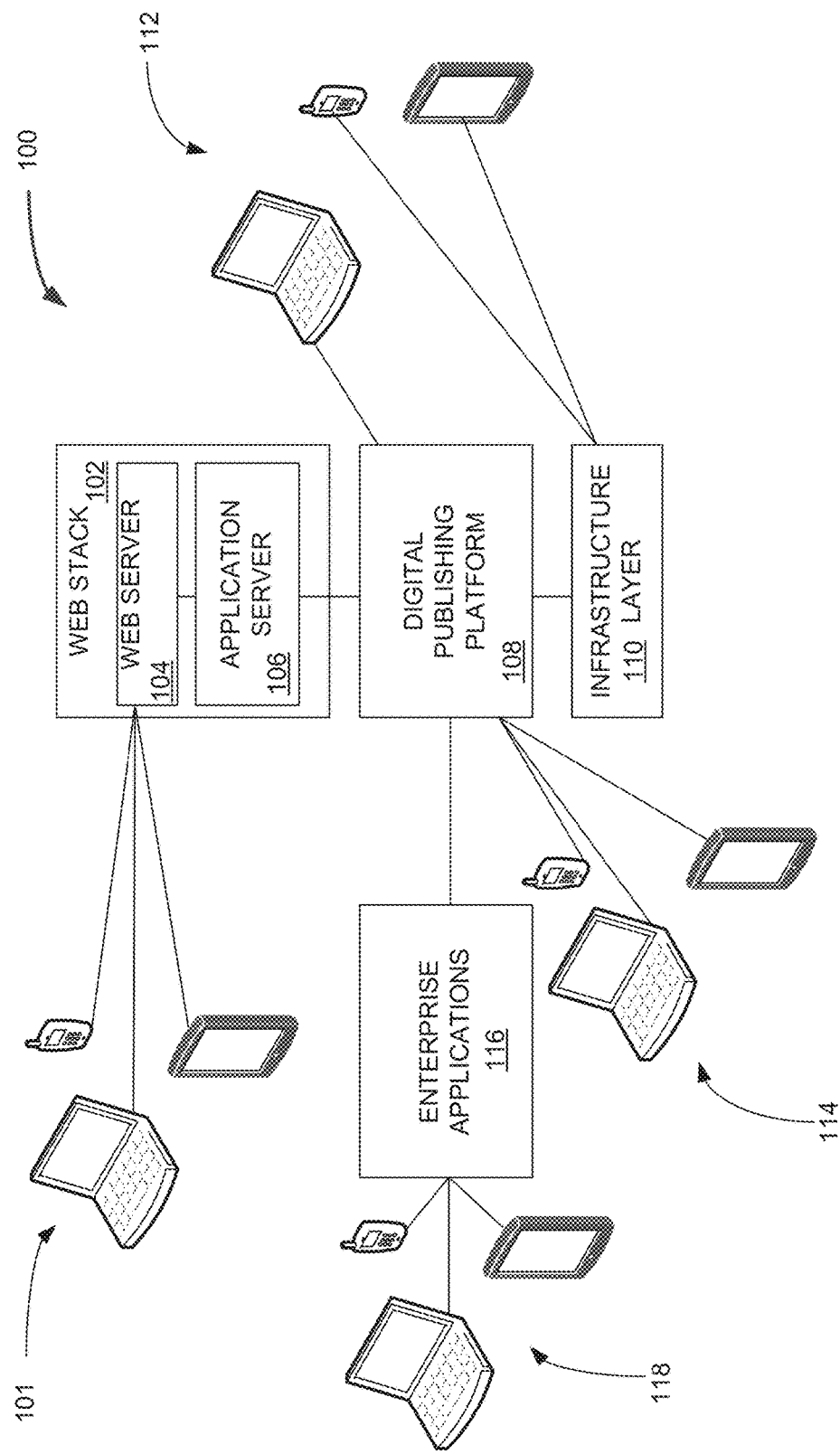
FIG. 1 is a block diagram of a system architecture, according to an example embodiment.

In addressing the various problems and challenges discussed above and to create a better customer and consumer experience, various embodiments provide a cost-effective platform-based solution to allow enterprises to adapt quickly to market changes and dynamic content lifecycles and to facilitate better, more informed, and timely decision making within an organization and by customers with regard to organizational content.

As a definitional point, content managed by a digital publishing platform may include many different types of content. For example, content may include a textual document, which may or may not include images, videos, audio, animations, and other content embedded therein. Content may also include images, audio files, video files, animations, templates, style sheets, fonts, and other media types that may be stored in data. A content item is a sub-element of content, such as a paragraph, a sentence, an image, a video or audio recording embedded in or a portion of a video or audio recording, and the like.

Various embodiments provide digital publishing platforms with the ability to integrate the digital publishing platform in a content-centric manner, specifically architected to eliminate limitations and challenges provided by current systems. Such embodiments are also flexible with regard to content discoverability and interoperable with industry adopted content types and file formats, tools, as well as technologies in content creation, storage, accessibility, and distribution.

The digital publishing platform, according to some embodiments, is based on a layered architecture having service-enabled features based on existing industry standard tools, technologies, and frameworks, providing a set of services that can be customized to meet business requirements and preferences. Moreover, the entire architecture in some such embodiments may be based on loosely coupled and pluggable components orchestrated to define specific business processes.

The layered architecture of the digital publishing platform of some embodiments ensures high scalability and flexibility to cater to functional and non-functional requirements, and even user preferences, such as for authoring content utilizing differing content development software tools. The layered architecture in some embodiments includes four layers: 1) Infrastructure layer; 2) Adapter layer; 3) Business component layer; and 4) Consumer layer. The Infrastructure layer typically includes content storage and information storage of an enterprise such that the digital publishing platform may be connected with virtual any repository that stores content. The Adapter layer provides support in establishing connectivity and interoperability between various content repositories and the platform and works as a connection between storage and digital publishing platform components, to make the digital publishing platform agnostic of any specific vendor implementation.

The Business component layer, in some embodiments, provides at least two different service types. The at least two different service types may include a set of 'Core' services and a set of 'Customizable' services. The 'Core' services, which may also be referred to as utility components or utility services, may be utilized to provide general digital publishing platform services, such as searching, manipulating configuration and security settings, and operations with regard to content. The 'Customizable' services, in some embodiments may be modified or altered to meet various business requirements. Through such modifications or alterations, the Customizable services render the digital publishing platform flexible to meet business process needs, such as integrating with one or more enterprise applications. In some such embodiments, the customizable services may include workflow, content transformation, content ingestion (i.e., content discovery, importing, parsing, storing, etc.), taxonomy and ontology services (i.e., taxonomy and ontology generation, maintenance, application, etc.), content enrichment (semantic analysis, formatting, aggregation, etc.), and collaboration services. Some embodiments may include additional sets of services. For example, an ancillary set of services may provide workflow services, reporting services, analytic services, and project and program management services, among other possibilities depending on the particular embodiment and system requirements.

The Service layer defines platform services that are consumable by various clients that include B2C (Business-to- Customer) and B2B (Business-to-Business) clients such as Web, Mobile, File Sharing protocol, and the like.

In some embodiments, the digital publishing platform may also or alternatively be connected with an integration hub, or service interface, in either a hardware or a software form, to connect and allow exchange information with enterprise-class applications (i.e., enterprise resource planning, accounting, customer relationship management, and the like). The integration hub may also connect and allow exchange of information with various end-consumer channels, such as application servers, web servers, interactive voice response systems, ad management services and platforms, social networking platforms, web channels, mobile channels, analytic platforms and services, and the like.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 architecture, according to an example embodiment. The system 100 illustrates an example of an architecture within which a digital publishing platform 108 may be deployed, according to some embodiments.

The system 100 includes web and mobile users 101 that may connect and interact with the digital publishing platform 108 over a network, such as the Internet, via a web stack 102. The web stack 102 may include one or more of a web server 104, application server 106, and other components, depending on the particular embodiment. The web stack 102 and components therein are typically connected to the digital publishing platform 108, although one or more firewalls and other threat management devices may be interposed there between. The web and mobile users 101 may request content via the web stack 102, such as by accessing a universal resource locator (URL) or other universal resource identifier (URI) of the web stack. The URL or URI may specifically identify content maintained by the digital publishing platform 108, identify a web page that triggers a retrieval of content from the digital publishing platform 108, or causes execution of one or more processes within the application server 106 to retrieve content from the digital publishing platform 108. In some embodiments, the accessing of digital content on the digital publishing platform 108 by web and mobile users 101 may be a content authoring action, such as updating content or storing new content.

The system 100 further includes an infrastructure layer 110 that generally stores content managed by the digital publishing platform 108. The infrastructure layer 110 may include one or more content management systems (CMS), or at least components thereof that store content. The infrastructure layer 110 also typically includes a file storage mechanism, such as a hard disk data storage device on which content files may be stored. In some embodiments, the infrastructure layer 110 may also include a relational database management system (RDBMS) and an extensible markup language database (XML DB). The CMS, XML DB, RDBMS, and file storage generally store content under management by the digital publishing platform 108.

The CMS of the infrastructure layer 110 typically stores content in a form as authored by a content authoring and editing software tool that maybe deployed to a client-computing device of an author 112. The content authoring and editing software tool may be one of a variety of different tools available on the market today, such as INDESIGN® available from Adobe Systems, Incorporated of San Jose, Calif. However, depending on the type of content being authored, the content authoring and editing software tool will vary. As a result, there may be more than one content management system present in the infrastructure layer. Further, different users or different groups or departments within an organization may prefer different software tools for a variety of different reasons. As the infrastructure layer is capable of supporting multiple content management systems, flexibility is provided.

The XML DB of the infrastructure layer 110 typically stores content of certain types, such as text content. The XML DB may also or alternatively store metadata descriptive of content for purposes of content discovery or searching, content aggregation, content indexing, and the like. The RDBMS of the infrastructure layer 110 may store data of various different types. For example, the RDBMS may store content, content indexes, transactional business data, configuration settings, security settings, and other data that may be utilized by the digital publishing platform 108 or other elements of the system 100.

Returning briefly to content authoring, the digital publishing platform 108 may also provide a web page based or stand-alone client content authoring tool. In various embodiments, this content authoring tool may be access via one of the client computing devices of authors 112, by a web or mobile user 101, or by other users, such as content consuming users 114.

The digital publishing platform 108, in some embodiments, is also integrated with one or more enterprise applications 116. Integration with an enterprise application 116 may allow content managed by the digital publishing platform 108 to be provided to the enterprise application 116. In other embodiments, content generated or present within the enterprise application 116 may be discovered by or pushed to the digital publishing platform 108. Through such integration, information contained within content consumed or generated by the enterprise application 116 and its users 118 may be leveraged in a content knowledge-base of an organization.

Figure 2:
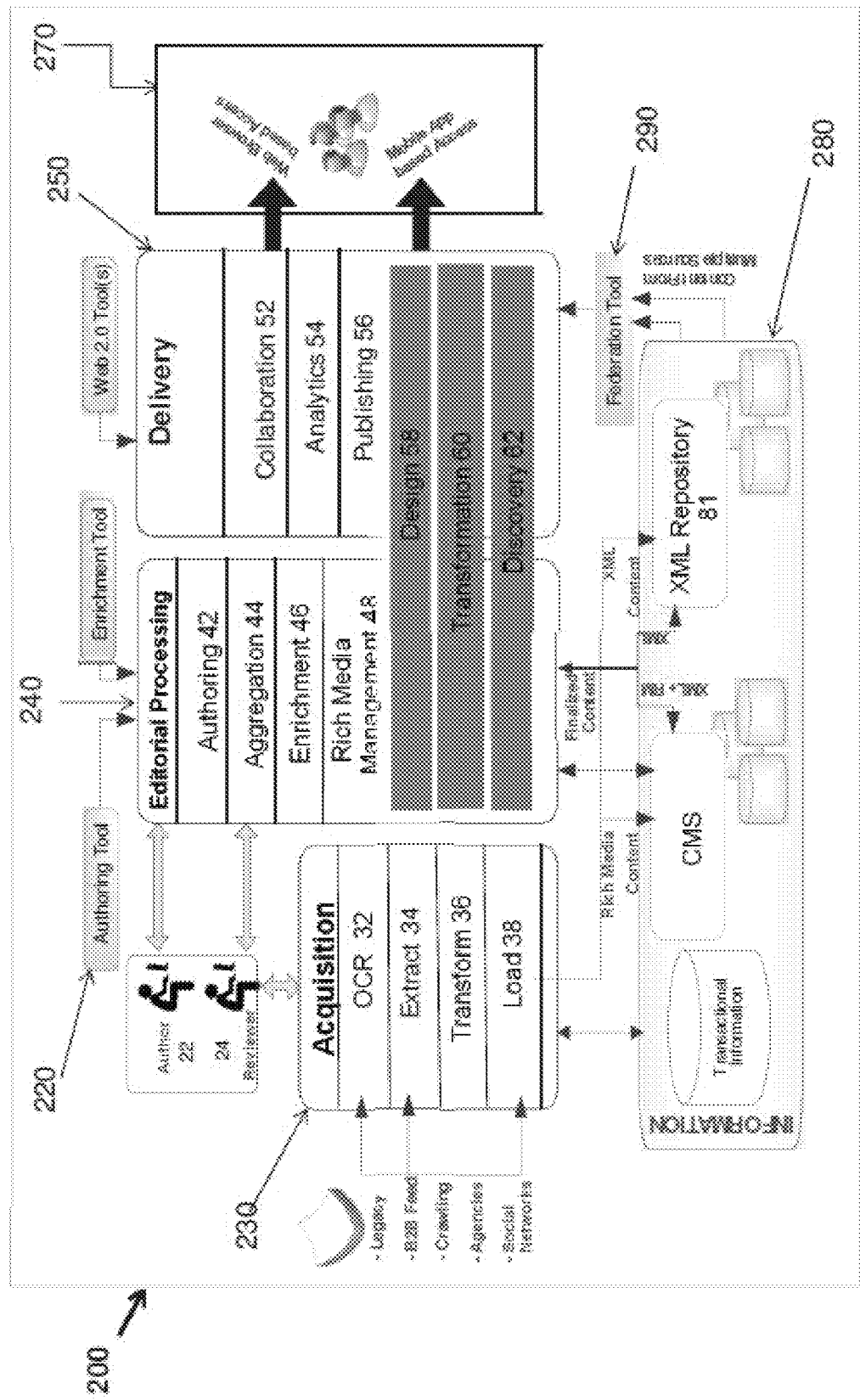
FIG. 2 illustrates a content-based management system including a digital publishing platform, according to an example embodiment.

FIG. 2 illustrates a content-based management system 200 including a digital publishing platform, according to an example embodiment. The content-based management system 200 includes an acquisition process 230, an authoring tool 220, an editorial process 240, and a delivery process 250.

The acquisition process 230 acquires content, such as, for example, from a CMS, an enterprise application, as transmitted to or imported into a digital publishing platform, such as by an author 22, received via a legacy system or other system, a B2B news fee, as discovered by a crawler or data mining process, received or retrieved from a social network or other website, and the like.

The acquisition process 230 may include optical character recognition (OCR) 32, extraction 34 of content from a document or other content data structure, transformation 36 of the content extracted 34 from the document or other content data structure, and loading 38 of the content in a digital publishing platform. The acquisition process can be supplemented by OCR 32 to convert scanned images into machine-encoded text. Using the extraction tool 34, the content can be extracted from various formats from various sources. The transformation tool 36 is used to convert the format of the content to a user-specific format. The information is then loaded to a target repository through the loading process 38. Once the content is acquired, the author 22, in some embodiments, transfers the content to the editorial processing tool 240. The editorial processing 240 may include a process of authoring 42, aggregation 44, content enrichment 46, and rich media management 48. The content enrichment 46 may include a semantic analysis and generation of content metadata based thereon. The enrichment may also include formatting of the content, application of templates or style sheets, and other such processes.

Apart from the acquisition process, the author 22 may also use an authoring tool 220 to develop content in enterprise format. The reviewer 24 reviews the authored content and finalizes the content. The author 22 may bring in content through different formats such as video, audio, image, and text and may finally publish content. Once the author 22 concludes the steps of editorial processing 240, the content may then be processed by the delivery processing 250 where the information may be the subject of collaboration 52 (i.e., group review which may include a defined workflow process facilitated by the collaboration 52 process or a dedicated workflow process), analyzed 54, and then published 56. During the editorial processing 240 and before the delivery process 250, the content data can be designed 58, transformed 260 and discovered 62, as per the requirement for a particular embodiment. The finalized content may then be stored in a unified repository 280 that includes various formats like extensible markup language (XML), hypertext markup language (HTML), PDF, e-Pub, and the like. In some embodiments, the finalized content is stored in a repository such as one or both of XML repository 81 and CMS. Once the information is stored in the repositories, the information may be delivered to an end user 270, on the end user's 270 web browser or a mobile application, and the like. Also provided is a federation tool 290 that provides a unified view of enterprise content repositories and enables reuse and re-purposing of the content.

Figure 3:
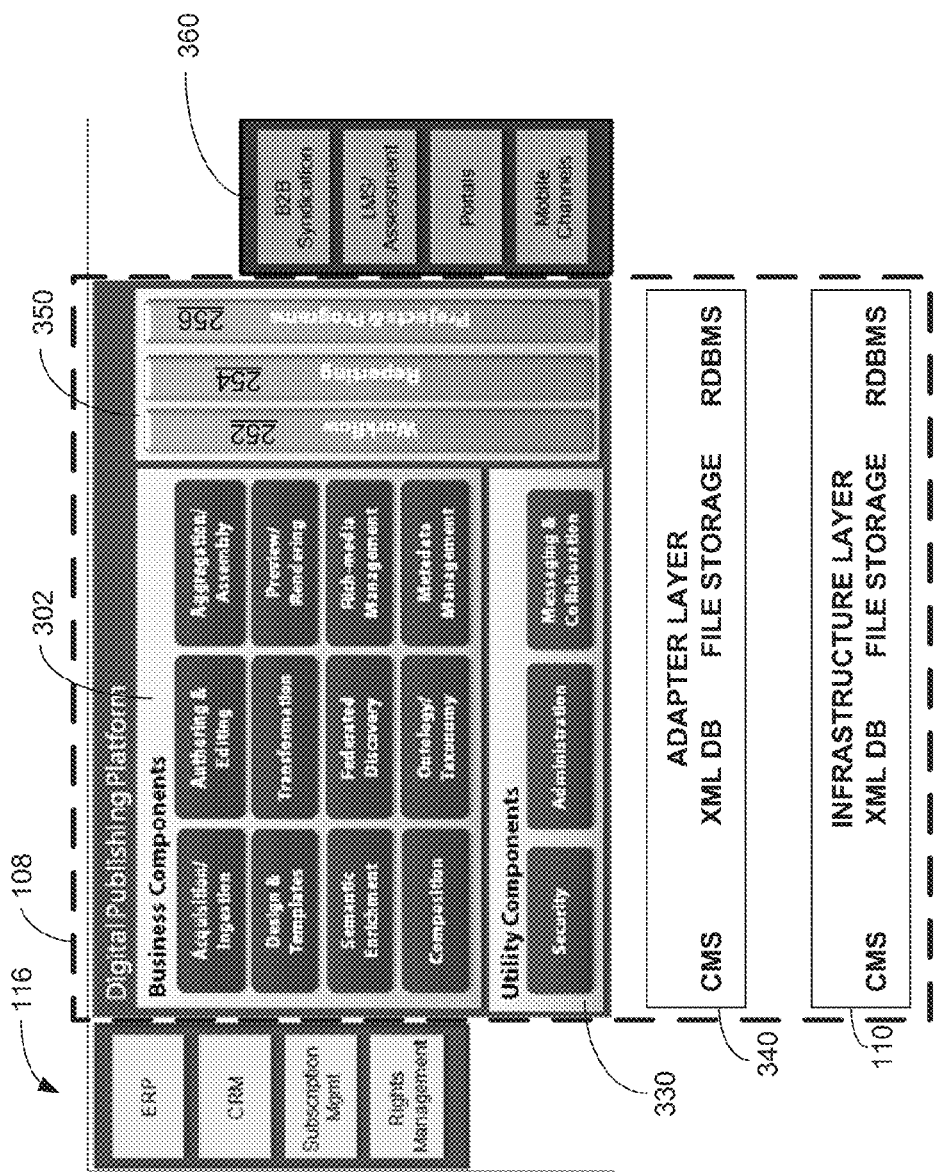
FIG. 3 is a block diagram of a digital publishing platform, according to an example embodiment.

FIG. 3 is a block diagram of a digital publishing platform 108, according to an example embodiment. The digital publishing platform 108 includes a set of business components 302 a set of utility components 330, a set of ancillary services 350, an adaptive layer 340, and an infrastructure layer 110. Note that the infrastructure layer 110, in some embodiments, may not be part of the digital publishing platform 108, but instead be accesses by the digital publishing platform 108 via the adapter layer 340.

As discussed previously, the infrastructure layer 110 includes one or more CMS, an XML DB, file storage, and a RDBMS. The digital publishing platform 108, and the various components and services therein, may access some data in the infrastructure layer directly 110, although such direct access will typically occur via one or more of a data network and one or more device drivers. In some such embodiments, and others, the adapter layer 340 provides interfaces through which the various components and services of the digital publishing platform 302 access data, such as content and content-related XML stored in the infrastructure layer 110. The adapter layer 340, in such embodiments, may include one or more adapters that operate to receive data access requests from the various components and services of the digital publishing platform 108, perform any transforms needed on the request depending on the target data source in the infrastructure layer 110, and forwards the transformed data request to the appropriate destination. The adapter then receives a response to the request, performs any needed transforms to the received response, and returns the response to the appropriate calling component or service of the various components and services in the digital publishing platform 108. The adapters in the adapter layer 340 are typically adapted, such as through configuration settings, to connect to and communicate with a particular repository (i.e., file storage) or data storage system (i.e., CMS, XML DB, RDBMS) in the infrastructure layer. Thus, the adapter layer 340 includes adapters that essentially operate as proxies for the various components and services of the digital publishing platform 108.

The utility components 330 generally include components that are utilized to maintain, administer, configure, secure, and to facilitate communication amongst users via the digital publishing platform. The utility components 330 may include one or more of a security component, an administration component, and a messaging and collaboration component.

The security component, in some embodiments, generally provides security settings and data security services with regard to certain data and content and users, roles, groups, departments, and the like. In some embodiments, the security component may include defined security policies that are associated with specific content items, groups of content, classes of content, content authored by certain individuals and the like. In some further embodiments, user identities, roles, security privilege class, and other such data may be defined and store in another system, but such data may be used to determine applicable security settings for users based on security rules and policies defined within the security component. Security data created and consumed by the security component may be stored in the RDBMS, the XML DB, or other data storage location of the infrastructure layer 110.

The administration component provides configuration abilities with regard to the digital publishing platform 108 and the various components and services therein. The administration component may store the configuration settings in the RDBMS, the XML DB, or other data storage location of the infrastructure layer 110.

The messaging and collaboration component provides mechanisms through which messages may be sent between digital publishing platform 108 users and collaborations conducted, such as with regard to content and aggregations of content.

The business components 302 generally include a plurality of components. Although a plurality of components are illustrated in FIG. 3 as included within the business components 302, few components and more components may be included in other embodiments. Further, in some embodiments, one or more of the illustrated components may be combined into a single component and single components may be divided into multiple components. Thus, the components illustrated as included within the business components 302 of the digital publishing platform 108 are provided as an example of one or more embodiments, but not all embodiments.

The business components 302 as illustrated in the example embodiment of FIG. 3 include the following:

Acquisition and Ingestion—In some embodiments, this component provides job and workflow driven batch and online ingestion processes to ingest HTML, PDF, word processing documents in organization defined XML format. Other content formats may also be included in some embodiments. Acquisition may be performed in response to input received by a user identifying content to be acquired. However, some embodiments include automatic content discovery mechanisms configured to crawl enterprise data and content storage, monitor certain folders or data storage locations, crawl websites, follow news or data feeds (i.e., RSS, ATOM, social media, etc.). The acquisition may also include receipt or obtaining images of documents, performing OCR on the documents, and extracted the text. Regardless of how a content item is obtained, in some embodiments, the acquisition and ingestion includes normalizing the content to a standardized form, depending on the particular content type acquired (i.e., text, video, audio, image). The normalizing will be performed to transform the content to a form for storing by the digital publishing platform 108. For example, text may be transformed into XML, images to JPEG, video to an open standards-based codec, and the like.

Authoring and editing—In some embodiments, one or more content authoring and editing tools may be provided. Generally, the tools may be accessed via the digital publishing platform 108, but access may be via client web browser. Some embodiments may provide a WYSIWYM (What You See Is What You Mean) authoring tool for Rich Text Editing, MathML, Annotation, Referencing, and Glossary. Other embodiments may also or alternatively provide suitable tools for authoring and editing various other content types, such as audio and video.

Aggregation/Assembly—Supports rule driven assembling to create aggregated content such as Chapter, Section, Book, Journal, Newsletter, Assessment Booklet, Manual etc. Some embodiments provide for aggregation of differing content types into a single form, such as a document, web page, animation, video, digital book, or other content type. Aggregations may be stored as XML representations that reference content items included in the aggregation and a template or style sheet to apply to the aggregation to give the aggregation, when assembled and viewed, a specific look, format, and arrangement.

Design and Templates—Designs and templates are actually a form of content that may be stored and maintained by the digital publishing platform 108 and applied to content to cause the content to be presented in a defined manner.

Transformation—Transformation is generally applicable when content is to be provided to another entity, such as in a B2B scenario, where the content needs to be provided in a specified form. The specified form may be specified by an industry standard, legal or regulatory requirement, a market-dominant entity, contract, or by another, for another purpose, or as a courtesy.

Preview/Rendering—Packages and renders content in different industry standard format such as HTML, PDF, ePub, among other formats for previewing or for rending, such as on a display, by a printing device or machine, or other rending type.

Semantic Enrichment—Provides support for automatic inline enrichment, such as through semantic analysis of text and metadata, and manual tagging of content. The tags may be stored to the XML DB of the infrastructure layer 110. The semantic analysis may be performed utilizing one or more software tools, such as one of the LUXID® tools available from TEMIS S.A. of Paris, France.

Federated Discovery—Metadata and Textual based discovery on relevance and ranking across repositories with faceted navigation and term highlighting.

Rich-Media Management—Rich-media management provides abilities for defining rules for different versions of content items to be generated, maintained, and rules for the provisioning thereof. For example, a configurable process may be included in some embodiments to generate multiple copies of a single content item, such as a video, where each copy is encoded according tFo a different file-type (i.e., .mov, .fla, .m2t, etc.). A rule may also be included that defines which file type of a content type will be provided when the request is received from a computing device using a particular web browser-type. Other examples should be readily apparent to one of skill in the art.

Composition—includes one or more processes that gathers and packages content as needed for a particular purpose to provide final shape to the content with rendition styles, such as book, manual, journal, and the like.

Ontology/Taxonomy—This provides management tools and association tools to manage an ontology/taxonomy for classification of content within an organization. This data may be consumed by the semantic enrichment and discovery components.

Metadata Management—This includes tools to manage definition of complex structured metadata and associations of metadata to particular content types, content from certain organizational areas, defining custom metadata tags, and other such management tasks.

The ancillary services 350 of the digital publishing platform 108 may include a number of services. For example, the services may include workflow 352, reporting 354, and projects and programs 356 services. The workflow services 352 include services and defined processes that are configurable and executable within a workflow engine to support complex scenarios such as peer review suitable for journal, manuscript submission, hiring processes, regulatory defined processes, and the like. The report services 354 include services that may generate reports on digital publishing platform 108 use, capacity, performance, security conditions, health, data rates, response time, and other such reports. The project and programs services 356 may include services tailored to specific project and program types.

In some embodiments, the business components 302, ancillary services 350, and utility components 330 may be accessed by one or more of enterprise applications 116, end channels 360, users internal to an organization, and users external to the organization, such as via the internet or mobile devices.

Figure 4:
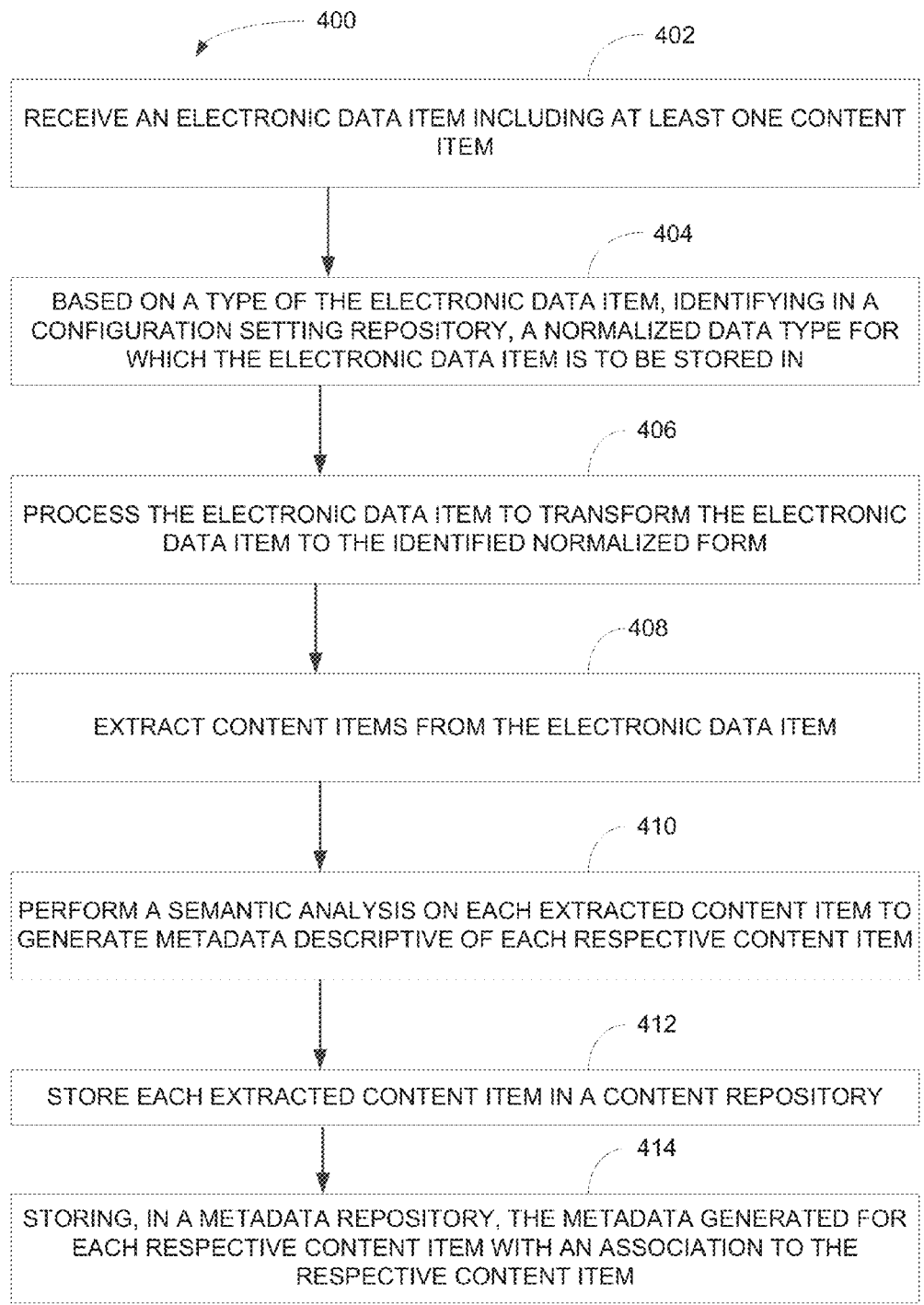
FIG. 4 is a block flow diagram of a method, according to an example embodiment.

FIG. 4 is a block flow diagram of a method 400, according to an example embodiment. The method 400 is an example of a method that may be performed by a digital publishing platform.

The method 400 includes receiving 402, via a network, an electronic data item including at least one content item. Based on a type of the electronic data item, the method 400 includes identifying 404 in a configuration setting repository, a normalized data type for which the electronic data item is to be stored in and processing 406 the electronic data item to transform the electronic data item to the identified normalized form. Content items may then be extracted 408 from the electronic data item a semantic analysis may be performed 410 on each extracted content item to generate a metadata descriptive of each respective content item. However, in other embodiments, the semantic analysis may be performed prior to the extracting 408. Each extracted content item may then be stored 412 in a content repository. The method 400 further includes storing 414, in a metadata repository, the metadata generated for each respective content item with an association to the respective content item. In some such embodiments, the metadata repository is a metadata portion of each extracted content item in which the respective metadata is stored. In other embodiments, the metadata repository may be a distinct data store, such as an XML DB.

In some embodiments of the method 400, receiving 402 the electronic data item includes monitoring at least one data storage location according to at least one stored configuration setting and identifying the electronic data item as being stored in the at least one data storage location. The electronic data item may then be retrieved via the network. In other embodiments, receiving 402 the electronic data item includes retrieving data from a subscription-based service via a network. For example, the electronic data item may be received by a RSS or ATOM feed.

In some embodiments, when the received 402 electronic data item is an image, the method 400 includes performing optical character recognition on the image to determine if the image includes text. When the image does not include text, the method 400 includes placing the electronic data item in a queue for manual processing and ending the method 400. However, when the image does include text, the method proceeds.

In some embodiments, the method 400 further includes receiving, via the network in a component of a digital publishing platform, a textual content query from a requesting computing device. The query may then be submitted to and XML DB within which the metadata of each stored content item is stored. In response thereto, metadata is received that identifies a plurality of content items. The method then proceeds by submitting the metadata to an aggregation component of the digital publishing platform from which an aggregation of the metadata is received. The aggregation may then be transmitted to the requesting computing device via the network. However, in some such embodiments, prior to transmitting the aggregation to the requesting computing device, the aggregation of metadata may be submitted to a rendering component of the digital publishing platform to generate a content rendering of a document including each content item referenced in the aggregation of metadata. Next, the content rendering is received in the form of an electronic document file, such as a textual document file in some embodiments, from the rending component and it is transmitted to the requesting computing device.

In some further embodiments, the metadata received in response to the query is associated with at least one video content item. In such embodiments, receiving the content rendering includes receiving the content rendering in the form of an electronic document file, such as an HTML file, PDF, or word processing document, including the video content item embedded therein.

Figure 5:
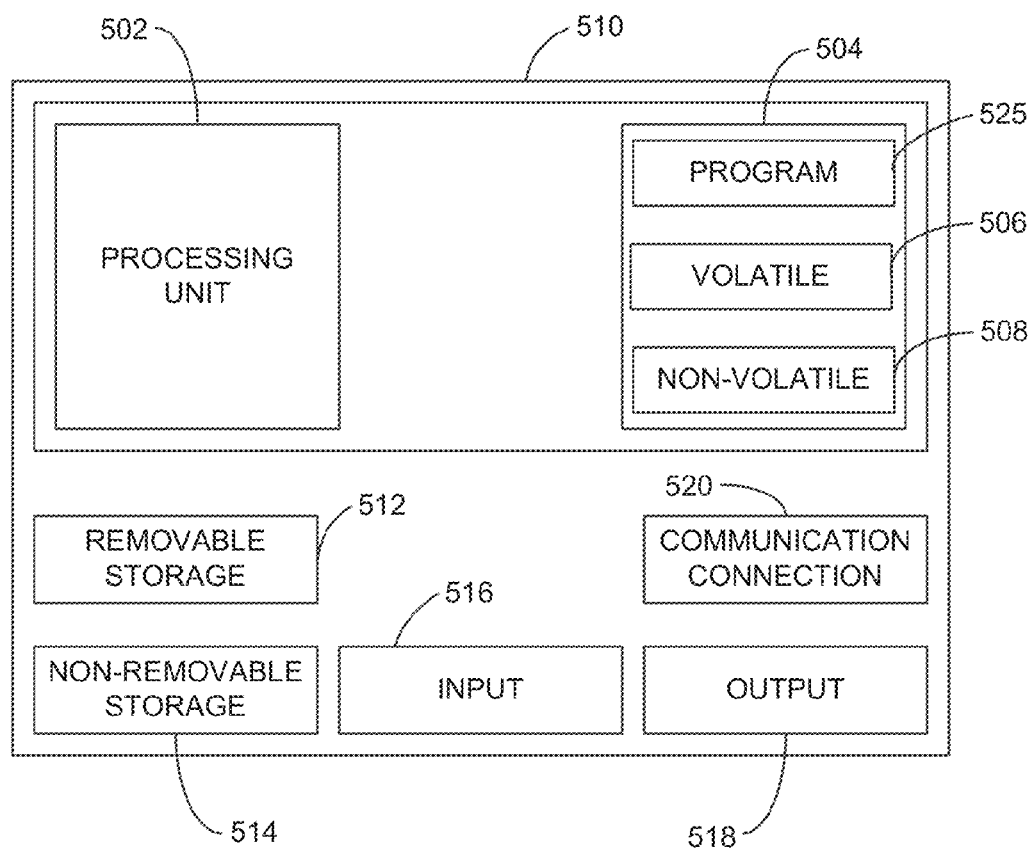
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example-computing device in the form of a computer 510, may include a processing unit 502, memory 504, removable storage 512, and non-removable storage 514. Although the example-computing device is illustrated and described as computer 510, the computing device may be in different forms in different embodiments. For example, the computing device may instead be a smartphone, a tablet, or other computing device including the same or similar elements as illustrated and described with regard to FIG. 5. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The input 516 may include one or more of a touchscreen, touchpad, mouse, keyboard, camera, and other input devices. The computer may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, via a network, an electronic data item including at least one content item;
   based on a type of the electronic data item, identifying in a configuration setting repository, a normalized data type for which the electronic data item is to be stored in;
   processing, through execution of instructions on at least one computer processor, the electronic data item to transform the electronic data item to the normalized data type so identified;
   extracting content items from the electronic data item;
   performing a semantic analysis on each extracted content item to generate metadata descriptive of each respective content item;
   storing each extracted content item in a content repository;
   storing, in a metadata repository, the metadata generated for each respective content item with an association to the respective content item;
   receiving, via the network, a textual content query from a requesting computing device, and submitting the textual content query to the metadata repository;
   receiving the metadata in response to the textual content query, and identifying a plurality of content items based on the metadata;
   receiving an aggregation of the metadata by submitting the metadata to an aggregation component of a digital publishing platform;
   submitting the aggregation of the metadata to a rendering component of the digital publishing platform to generate a content rendering including each content item referenced in the aggregation of the metadata;
   receiving the content rendering in the form of an electronic document from the rending component; and
   transmitting the electronic document file to the requesting computing device via the network.

2. The method of claim 1, wherein the metadata repository is a metadata portion of each extracted content item in which the respective metadata is stored.

3. The method of claim 1, wherein when the received electronic data item is an image, the method further comprises:
   performing optical character recognition on the image to determine if the image includes text; and when the image does not include text, placing the electronic data item in a queue for manual processing and ending the method; and when the image does include text, proceeding with the method.

4. The method of claim 1, wherein the metadata repository is an extensible markup language (XML) database system.

5. The method of claim 1, wherein:
   the metadata received in response to the query is associated with at least one video content item; and
   receiving the content rendering in the form of an electronic document file includes receiving an electronic document file including the video content item embedded therein.

6. The method of claim 1, wherein the electronic document file is a document encoded in hypertext markup language (HTML).

7. The method of claim 1, wherein receiving the electronic data item includes:
   monitoring at least one data storage location according to at least one stored configuration setting;
   identifying the electronic data item as being stored in the at least one data storage location; and
   retrieving the electronic data item via the network.

8. The method of claim 1, wherein receiving the electronic data item includes retrieving data from a subscription-based service via a network.

9. The method of claim 1, wherein the electronic data item is a textual document file.

10. A non-transitory computer-readable medium, with instructions stored thereon, which when executed by at least one computer processor, causes a computer to perform a method comprising:
    receiving, via a network, an electronic data item including at least one content item;
    based on a type of the electronic data item, identifying in a configuration setting repository, a normalized data type for which the electronic data item is to be stored in;
    process the electronic data item to transform the electronic data item to the normalized data type so identified;
    extracting content items from the electronic data item;
    performing a semantic analysis on each extracted content item to generate metadata descriptive of each respective content item;
    storing each extracted content item in a content repository;
    storing, in a metadata repository, the metadata generated for each respective content item with an association to the respective content item;
    receiving, via the network, a textual content query from a requesting computing device, and submitting the textual content query to the metadata repository;
    receiving the metadata in response to the textual content query, and identifying a plurality of content items based on the metadata;
    receiving an aggregation of the metadata by submitting the metadata to an aggregation component of a digital publishing platform;
    submitting the aggregation of the metadata to a rendering component of the digital publishing platform to generate a content rendering including each content item referenced in the aggregation of the metadata;
    receiving the content rendering in the form of an electronic document from the rending component; and
    transmitting the electronic document file to the requesting computing device via the network.

11. The non-transitory computer-readable medium of claim 10, wherein the metadata repository is a metadata portion of each extracted content item in which the respective metadata is stored.

12. The non-transitory computer-readable medium of claim 10, wherein when the received electronic data item is an image, the non-transitory computer-readable medium includes further instructions to cause the computer to:
   perform optical character recognition on the image to determine if the image includes text;
   when the image does not include text, place the electronic data item in a queue for manual processing and ending the method; and
   when the image does include text, proceed with the method.

13. The non-transitory computer-readable medium of claim 10, wherein the metadata repository is an extensible markup language (XML) database system.

14. The non-transitory computer-readable medium of claim 10, wherein:
   the metadata received in response to the query is associated with at least one video content item; and
   receiving the content rendering in the form of an electronic document file includes receiving an electronic document file including the video content item embedded therein.

15. The non-transitory computer-readable medium of claim 10, wherein the electronic document file is document encoded in hypertext markup language (HTML).

16. The non-transitory computer-readable medium of claim 10, wherein receiving the electronic data item includes:
   monitoring at least one data storage location according to at least one stored configuration setting;
   identifying the electronic data item as being stored in the at least one data storage location; and
   retrieving the electronic data item via the network.

17. The non-transitory computer-readable medium of claim 10, wherein receiving the electronic data item includes retrieving data from a subscription-based service via a network.

18. The non-transitory computer-readable medium of claim 10, wherein the electronic data item is a textual document file.

* * * * *